United States Patent [19]

Kijima et al.

[11] Patent Number: 4,826,203

[45] Date of Patent: May 2, 1989

[54] AUTOMOBILE SUB-FRAME STRUCTURE

[75] Inventors: Takao Kijima; Fumitaka Ando; Toshihide Koyama, all of Hiroshima, Japan

[73] Assignee: Mazda Motor Corporation, Hiroshima, Japan

[21] Appl. No.: 181,423

[22] Filed: Apr. 14, 1988

[30] Foreign Application Priority Data

Apr. 14, 1987 [JP] Japan .................................. 62-92638

[51] Int. Cl.[4] ........................ B60G 7/02; B62D 21/11
[52] U.S. Cl. .................................. 280/690; 280/701; 280/788
[58] Field of Search .............. 280/701, 698, 697, 690, 280/666, 724, 725, 788, 781; 296/204, 203

[56] References Cited

U.S. PATENT DOCUMENTS 2,254,282  9/1941  Griswold ........................... 280/788

FOREIGN PATENT DOCUMENTS 3004194  8/1981  Fed. Rep. of Germany ...... 280/690
3136125  4/1983  Fed. Rep. of Germany ...... 280/788

Primary Examiner—David M. Mitchell
Assistant Examiner—Karin L. Ferriter
Attorney, Agent, or Firm—Wenderoth, Lind & Ponack

[57] ABSTRACT

An automobile sub-frame structure for supporting two double wishbone type rear suspensions on its respective sides includes a pair of juxtaposed first members extending in a direction widthwise of a vehicle body, a pair of opposed second members extending substantially vertically and each rigidly secured at an upper portion thereof to one end of each first member, and a pair of third members rigidly secured to lower portions of the second members and to a lower surface of a central portion of each first member. In the sub-frame structure, a plurality of truss structures are formed by the first, second and third members so that the sub-frame structure will be sufficiently rigid. Each double wishbone type rear suspension includes upper and lower control arms for pivotably supporting a rear wheel, which control arms are pivotably connected at their inner ends to the second members in the vicinity of portions connecting the first and second members and in the vicinity of portions connecting the second and third members, respectively.

16 Claims, 4 Drawing Sheets

AUTOMOBILE SUB-FRAME STRUCTURE

BACKGROUND OF THE INVENTION

1. Field of the Invention

The present invention generally relates to an automobile framework, and more particularly, to an automobile sub-frame structure for supporting two double wishbone type rear suspensions on respective sides thereof.

2. Description of the Prior Art

Japanese Utility Model Laid-open Application (Jikkaisho) No. 58-167205 discloses a double wishbone type suspension as one form of automobile suspension, which is frequently utilized to pivotably support a wheel by way of a pair of upper and lower control arms.

In the aforementioned known double wishbone type suspension, each of the upper and lower control arms is generally pivotably connected at one end to a sub-frame constituting a rear cross member. However, the sub-frame cannot be formed into a one-piece construction without being formed into an extremely complicated configuration in order to avoid interference between the sub-frame and a differential unit and to assuredly maintain suitable camber of the rear wheels. Accordingly, there has been an increased demand for a sub-frame of simple construction.

SUMMARY OF THE INVENTION

Accordingly, the present invention has been developed with a view to substantially eliminating the above described disadvantage inherent in the prior art automobile sub-frame structure for supporting two double wishbone type rear suspensions on respective sides thereof, and has for its essential object to provide an improved automobile subframe structure which is simple in construction and which has satisfactorily high rigidity.

In accomplishing this and other objects, an automobile sub-frame structure of the present invention for supporting the double wishbone type rear suspension includes a pair of juxtaposed first members extending in a direction widthwise of a vehicle body, a pair of opposed second members extending substantially vertically and each rigidly secured at its upper portion to one end of each first member, and a pair of third members rigidly secured to lower portions of the second members and to a lower surface of a central portion of each first member.

In such sub-frame structure, a plurality of truss structures are formed by the aforementioned three members so that the sub-frame structure will be sufficiently rigid.

Each double wishbone type rear suspension includes upper and lower control arms for pivotably supporting each rear wheel, which control arms are pivotably connected at their inner ends to the second members in the vicinity of portions connecting the first and second members and in the vicinity of portions connecting the second and third members, respectively.

According to the present invention, since the sub-frame for supporting the double wishbone type rear suspension is formed by connecting three kinds of the first, second and third members, each member can be extremely simplified in construction to be readily manufactured at a low cost.

Moreover, since a plurality of truss structures are formed by the first, second and third members, the sub-frame is sufficiently rigid to support two rear suspensions on respective sides thereof.

BRIEF DESCRIPTION OF THE DRAWINGS

This and other objects and features of the present invention will become more apparent from the following description taken in conjunction with the preferred embodiment thereof with reference to the accompanying drawings, throughout which like parts are designated by like reference numerals, and in which.

DETAILED DESCRIPTION OF THE PREFERRED EMBODIMENT

Figure 1:
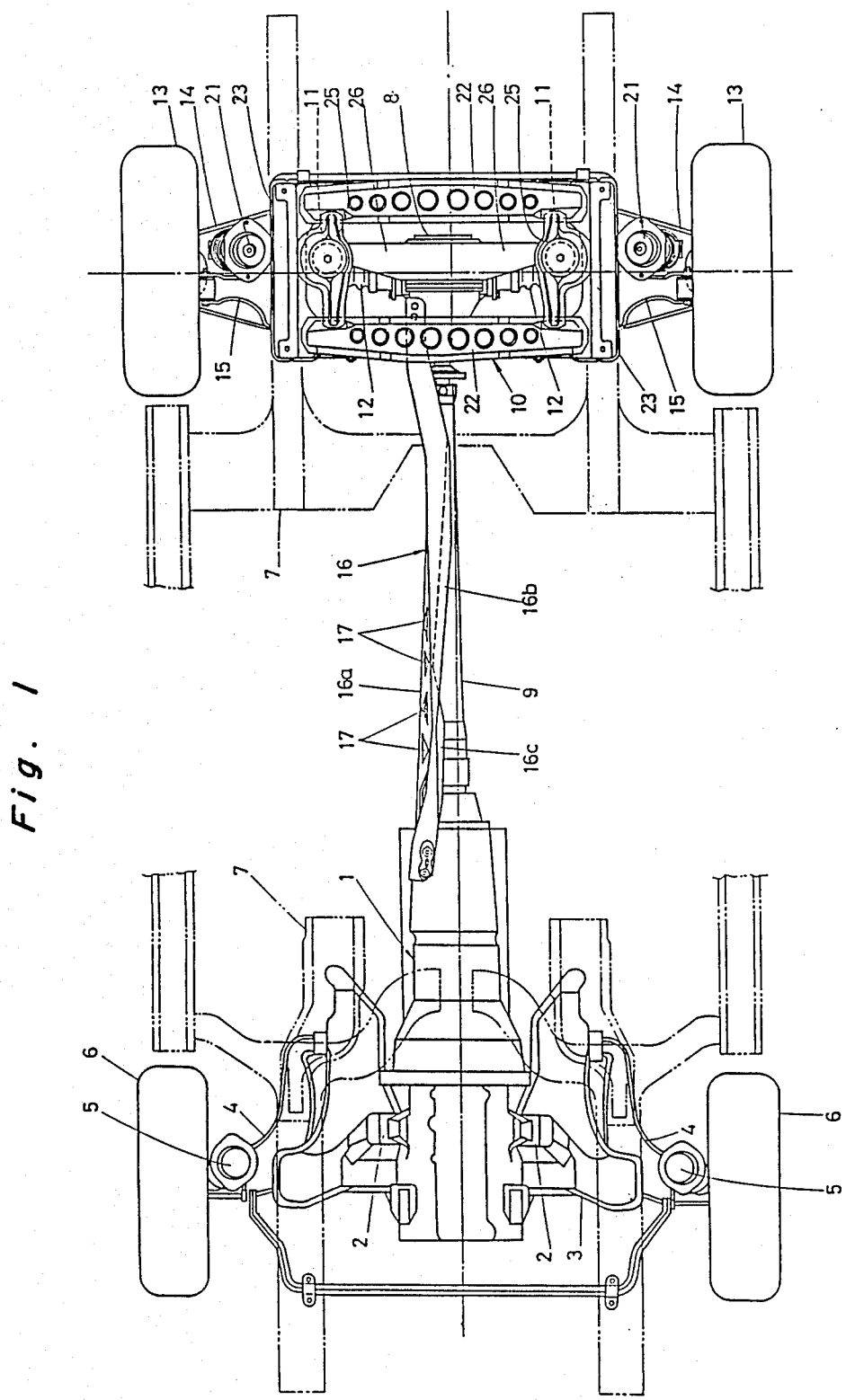
FIG. 1 is a top plan view of a chassis of an automotive vehicle having therein a sub-frame structure according to an embodiment of the present invention.

Referring first to FIG. 1, an engine and mission unit 1 to be loaded on a front side of an automotive vehicle is securely mounted on a front cross member 3 by way of a pair of widthwise arranged engine mounts or engine supports 2 in any known manner. A pair of control arms 4 are pivotably connected at their respective ends to opposite ends of the front cross member 3 whereas a pair of front wheels 6 are pivotably connected to the other respective ends of the control arm 4. The front wheels 6 are supported by a vehicle body 7 through a pair of respective damper units 5. The front cross member 3 is supported by the vehicle body 7 through a suitable elastic member (not shown) in any known manner. The engine and mission unit 1 is comprised of an engine as a driving source, a clutch and a mission or transmission.

The engine and mission unit 1 is coupled with a differential unit 8 loaded on a rear side of the automotive vehicle by way of a driving shaft 9. The differential unit 8 is carried by a sub-frame 10 constituting a rear cross member through a mounting member and is so constructed as to transmit driving force to rear wheels 13 by way of respective axle shafts 12. The sub-frame 10 is carried by the vehicle body 7 by a suitable elastic member (not shown) in any known manner.

The engine and mission unit 1 and the differential unit 8 are securely coupled with each other by a power plant frame 16 having a cross section generally in the form of a figure "U". The power plant frame 16 has one vertical side 16a and two opposed upper and lower horizontal sides 16b and 16c extending from opposite horizontal edges of its vertical side 16a so that an opening may be formed between the opposed horizontal sides 16b and 16c. Accordingly, the power plant frame 16 is relatively rigid with a high resistance against bending and is flexible with respect to torsion. Furthermore, in this embodiment, a plurality of holes 17 having a suitable configuration are formed in the vertical side 16a of the power plant frame 16 and, each of the horizontal sides 16b and 16c thereof has an intermediate portion narrower than its opposite end portions. Consequently, the power plant frame 16 not only maintains sufficient bending rigidity, but is improved in flexibility with respect to torsion, with its own weight being lightened. The power plant frame 16 is so mounted in the vehicle body as to encircle the majority of the driving shaft 9.

Figure 2:
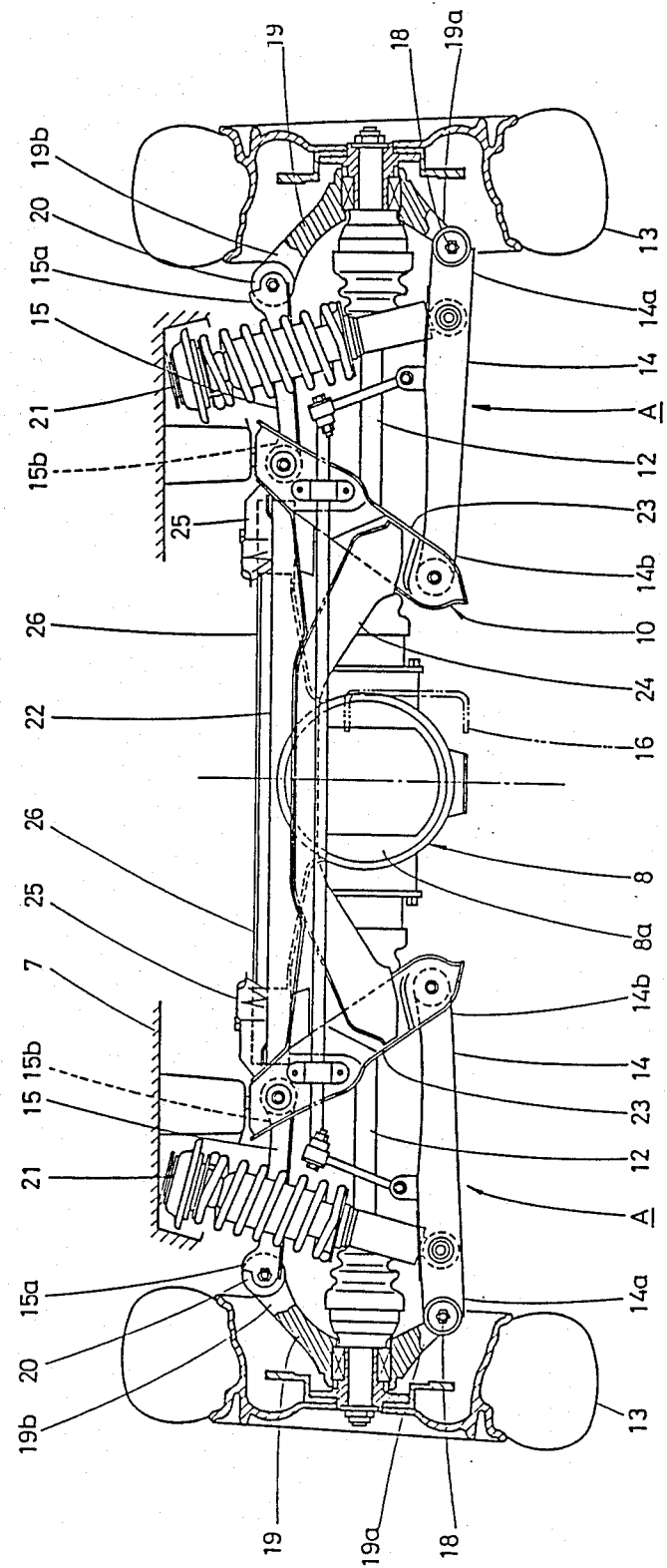
FIG. 2 is a front elevational view, partly in section, of the sub-frame structure of the present invention.
Figure 3:
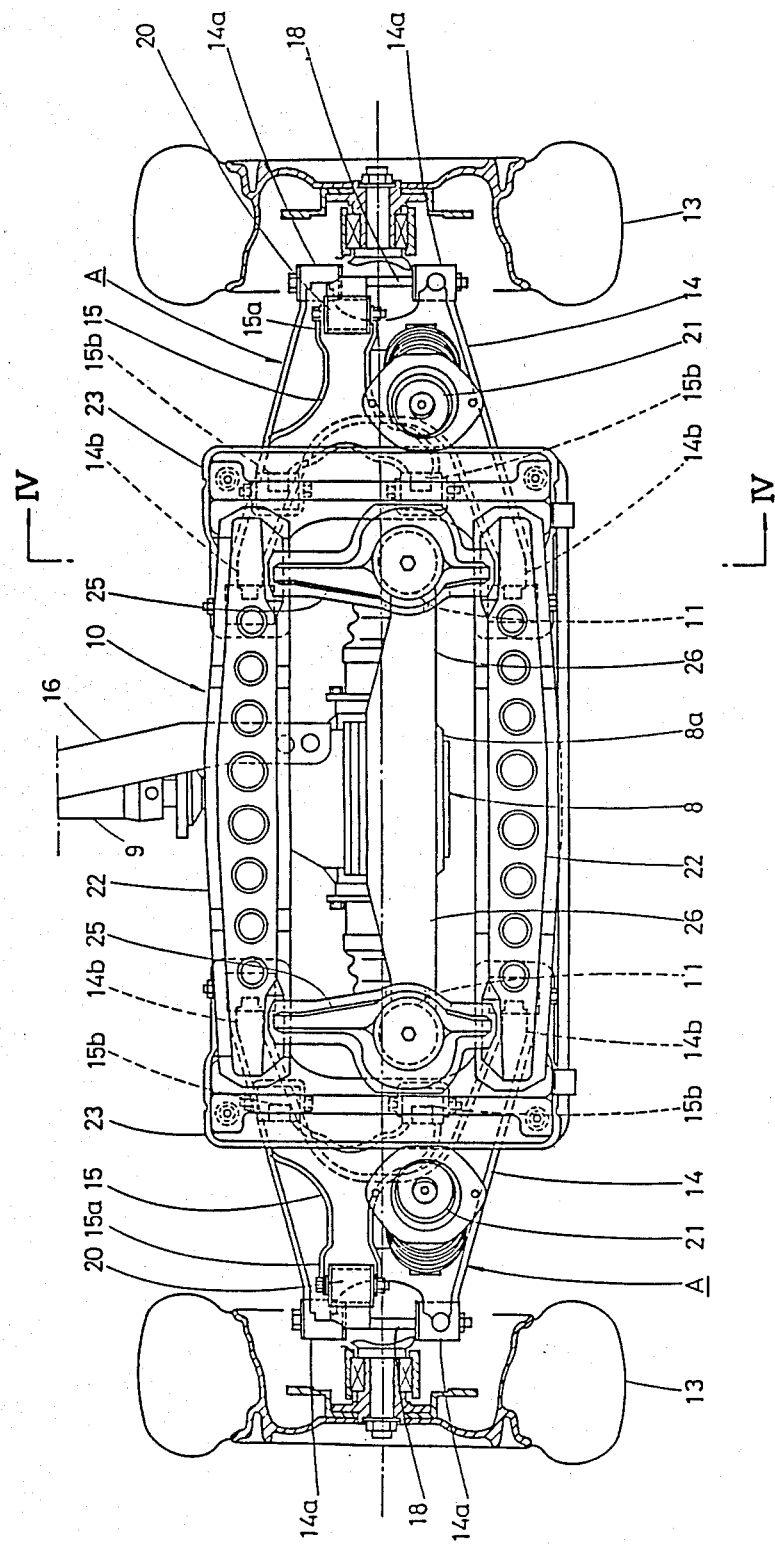
FIG. 3 is a top plan view, partly in section, of the sub-frame structure of FIG. 2.

Referring next to FIGS. 2 and 3, a rear suspension A for pivotably supporting each of rear wheels 13 of the automotive vehicle will be explained hereinafter according to one preferred embodiment of the present invention.

The rear suspension A is of a double wishbone type comprising an H-shaped lower control arm 14, an A-shaped upper control arm 15, a shaft 18 pivotably connected at its opposite ends to opposed outer end portions 14a of the lower control arm 14, a knuckle arm or wheel support 19 having a lower end portion pivotably connected with the shaft 18 and an upper end portion 19b pivotably connected with an outer end portion 15a of the upper control arm 15 by way of a bush 20, and a damper unit 21 pivotably connected at its lower end with the lower control arm 14.

The damper unit 21 is located at the back of the upper control arm 15 in a direction longitudinally of the vehicle body 7 and has an upper end portion supported by the vehicle body 7 in any known manner. In this way, since the upper control arm 15 and the damper unit 21 are spaced apart from each other or arranged in an offset relationship in the longitudinal direction of the vehicle body 7, the design freedom for arranging both the upper control arm 15 and the damper unit 21 can be assuredly retained within a limited space between the sub-frame 10 and each rear wheel 13, thus preventing interference between the damper unit 21 and the axle shaft 12. Particularly, as shown in this embodiment, that is to say, in the case of a chassis structure of a construction such that the engine and mission unit 1 disposed at the front of the vehicle body 7 and the differential unit 8 disposed at the rear thereof are rigidly coupled with each other by way of the power plant frame 16, a longer interval between mounting portions of the differential unit 8 suitable for mounting it on the vehicle body 7 is of greater advantage to torsion or the like. This fact limits the space to be formed between each rear wheel 13 and the sub-frame 10 for mounting therein the rear suspension A. Accordingly, the offset relationship between the upper control arm 15 and the damper unit 21 in a direction longitudinally of the vehicle body 7 can advantageous to freedom of design for the arrangement thereof.

In the conventional double wishbone type suspension, since the damper unit is disposed inside the upper control arm, the ability to service the damper unit has disadvantageously extremely been lowered.

On the contrary, in this embodiment, the damper unit 21 and the upper control arm 15 are located offset from each other in a direction longitudinally of the vehicle body 7. This fact can remarkably improve the ability to service the damper unit 21.

On the other hand, the sub-frame 10 is composed of a pair of juxtaposed first members 22 extending in parallel relationship in a direction widthwise of the vehicle body, a pair of obliquely standing opposed second members 23 each rigidly secured at its upper portion to one end of each first member 22 and a pair of third members 24 extending immediately below respective first members 22 and having opposite ends rigidly secured to lower portions of the second member 23, with an intermediate portion of each third member 24 being rigidly secured to the lower surface of an intermediate portion of each first member 22. To each second member 23 are pivotably connected the inner ends 14b and 15b of the lower and upper control arms 14 and 15 constituting the rear suspension A. The first and third members 22 and 24 form at their respective end portions a plurality of truss structures with the second members 23. Each of these first, second and third members 22, 23 and 24 is composed of a frame member having a hat-shaped cross section or a cross section generally in the form of a figure "U". The first and third members 22 and 24 are open at their lower and upper portions, respectively, whereas the second members 23 are open at their outer portions in directions widthwise of the vehicle body. The central portions of both the first and third members form a closed configuration in cross section. Each of the second members consists of two vertical portions connected to the end portions of the first and third members and one longitudinally extending portion connecting upper ends of the two vertical portions. The vertical and longitudinally extending portions of each second member form a configuration generally in the form of a "U". The upper and lower control arms extend through the outer opening portion of each second member and are pivotably connected therewith inside it.

Conventionally, the sub-frame 10 has been formed into a one-piece construction of a complicated configuration so that no interference between the sub-frame 10 and the differential unit 8 will take place at the rear of the automotive vehicle to maintain the camber of each rear wheel 13.

However, the sub-frame 10 of the present invention can be formed advantageously into an assembly comprised of three kinds of frame members each having an extremely simple configuration, with the rigidity thereof being sufficient to support the rear suspension A on each side thereof.

Furthermore, a pair of brackets 25 for supporting the differential unit 8 extend in parallel relationship with adjacent second members 23 in a direction longitudinally of the vehicle body 7. Each of the brackets 25 is rigidly secured at its opposite ends to the upper surfaces of the first members 22 in the vicinity of the end portions thereof. In this embodiment, each bracket 25 is further securely connected at its outer intermediate portion with the upper surface of each second member 23. The brackets 25 operate as reinforcement members for securely connecting both of the first and second members 22 and 23, thus making a great contribution to higher rigidity.

Figure 4:
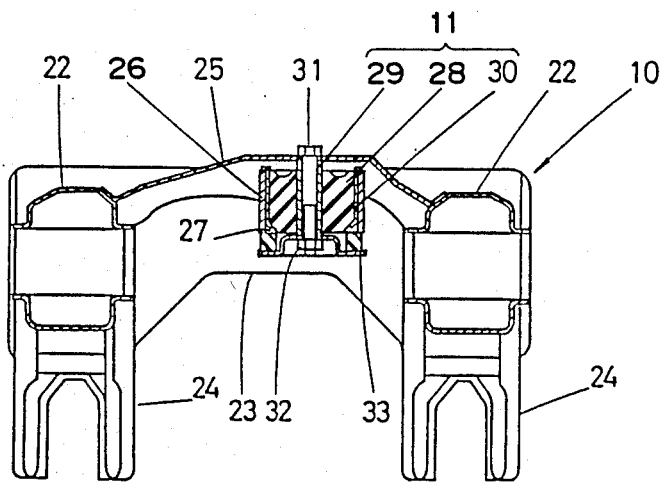
FIG. 4 is an enlarged sectional view taken along the line IV—IV in FIG. 3.

Two support arms 26 are integrally formed with a casing 8a of the differential unit 8 and extend therefrom in opposite directions towards both the brackets 25. A through-opening 27, into which an elastic member 11 for mounting the differential unit 8 is pressed, is formed in an end portion of each support arm 26, as shown in FIG. 4. The elastic member 11 is comprised of a cylindrical rubber member 28, a cylindrical spacer 29 extending through and secured in the central portion of the rubber member 28 and a retainer 30 covering the outer periphery of the rubber member 28. Each support arm 26 and each bracket 25 are coupled with each other by means of a bolt 31 extending through the spacer 29 of the elastic member 11, a nut 32 screwed to the lower end of the bolt 31 and a washer 33 interposed between the elastic member 11 and the nut 32.

As described so far, according to the present invention, the sub-frame 10 adapted to support the double wishbone type rear suspension A is comprised of a pair of juxtaposed first members 22 extending in a direction widthwise of the vehicle body, a pair of opposed second members 23 disposed at the end portions of the first members 22 and a pair of third members 24 each having opposite ends rigidly secured to the lower portions of the second members 23 and an intermediate portion rigidly secured to the lower surface of an intermediate portion of each first member 22. Furthermore, not only are the upper and lower control arms 15 and 14 of the rear suspension A pivotably connected at their inner ends 15b and 14b to the second members 23, but a plurality of truss structures are formed by the first, second and third members 22, 23 and 24. Accordingly, the sub-frame 10 having sufficient rigidity can be obtained by connecting three kinds of the first, second and third members 22, 23 and 24 each having a simple configuration and an extemely simplified structure. The sub-frame 10 of such a construction can be readily manufactured advantageously at a low cost.

Although the present invention has been fully described by way of examples with reference to the accompanying drawings, it is to be noted here that various changes and modifications will be apparent to those skilled in the art. Therefore, unless such changes and modifications otherwise depart from the spirit and scope of the present invention, they should be construed as being included therein.

What is claimed is:

1. A sub-frame structure for use in an automotive vehicle to support two double wishbone type suspensions on respective sides thereof, each double wishbone type suspension including upper and lower control arms for pivotably supporting a respective rear wheel, said sub-frame structure comprising:
   at least one first member extending in a direction widthwise of a vehicle body;
   a pair of opposed second members extending substantially vertically and each rigidly secured at its upper portion to one end of said first member; and
   at least one third member rigidly secured to lower portions of said second members and to a lower surface of a central portion of said first member;
   a plurality of truss structures being formed by said first, second and third members, the upper and lower control arms being pivotably connected at their inner ends to said second members in the vicinity of portions connecting said first and second members and in the vicinity of portions connecting said second and third members, respectively.

2. The sub-frame structure as claimed in claim 1, wherein said third member extends immediately below said first member in a direction widthwise of the vehicle body and has opposite ends rigidly secured to said lower portions of said second members and a central portion rigidly secured to said central portion of said first member.

3. The sub-frame structure as claimed in claim 2, wherein said sub-frame structure comprised of said first, second and third members has at least at one portion thereof a cross section generally in the form of a "U".

4. The sub-frame structure as claimed in claim 3, wherein said first member has a cross section generally in the form of a "U" with its lower portion being opened and said third member has a cross section generally in the form of a "U" with its upper portion being opened, while the central portions of both of said first and third members form a closed configuration in cross section.

5. The sub-frame structure as claimed in claim 4, wherein each of said second members has a cross section generally in the form of a "U" with its outer portion in a direction widthwise of the vehicle body being opened, the pivotal connection between said sub-frame structure and the upper and lower control arms being inside said second members.

6. The sub-frame structure as claimed in claim 2, wherein both of said first and third members are respectively in the form of two members spaced apart from each other in a direction longitudinally of the vehicle body.

7. The sub-frame structure as claimed in claim 6, wherein each of said second members has two vertical portions connected to end portions of said first and third members and one longitudinally extending portion connecting upper ends of said vertical portions, said vertical and longitudinally extending portions forming a configuration generally in the form of a "U".

8. The sub-frame structure as claimed in claim 7, wherein said sub-frame structure supports a differential unit for transmitting driving force to the rear wheels, said differential unit being located immediately below the central portions of said first and third members.

9. The sub-frame structure as claimed in claim 8, wherein said differential unit is supported by a pair of brackets each connected with at least two of said first and second members.

10. The sub-frame structure as claimed in claim 9, wherein each of said brackets connects said first members with each other.

11. The sub-frame structure as claimed in claim 10, wherein each of said brackets is located in the vicinity of the end portions of said first members and connected with the longitudinally extending portion of the adjacent second member.

12. The sub-frame structure as claimed in claim 7, wherein said sub-frame structure comprised of said first, second and third members has at least at one portion thereof a cross section generally in the form of a "U".

13. The sub-frame structure as claimed in claim 12, wherein each of said first members has a cross section generally in the form of a "U" with its lower portion being opened and each of said third members has a cross section generally in the form of a "U" with its upper portion being opened, while the central portions of both of said first and third members form a closed configuration in cross section.

14. The sub-frame structure as claimed in claim 12, wherein each of said second members has a cross section generally in the form of a "U" with its outer portion in a direction withwise of the vehicle body being opened, the pivotal connection between said sub-frame structure and the upper and lower control arms being inside said second members.

15. The sub-frame structure as claimed in claim 14, wherein said upper and lower control arms have respective front and rear end portions connected with front and rear vertical portions of the respective said second member.

16. The sub-frame structure for use in an automotive vehicle to support two rear suspensions on respective sides thereof, each rear suspension including at least one suspension arm for pivotably supporting a respective rear wheel, said sub-frame structure comprising:
   at least one first member extending in a direction widthwise of a vehicle body;
   a pair of opposed second members extending substantially vertically and each rigidly secured at its upper portion to one end of said first member; and at least one third member extending immediately below said first member in a direction widthwise of the vehicle body and rigidly secured at its opposite end portions to lower portions of said second members and to a lower surface of a central portion of said first member;

a plurality of truss structures being formed by said first, second and third members, the suspension arm being pivotably connected at its inner end to a lower portion of one of said second members.

* * * * *